(12) United States Patent  (10) Patent No.: US 11,195,475 B2
Tomokawa  (45) Date of Patent: Dec. 7, 2021

(54) IMAGE DISPLAY DEVICE

(71) Applicant: SHARP KABUSHIKI KAISHA, Sakai (JP)

(72) Inventor: Shinji Tomokawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 97 days.

(21) Appl. No.: 16/499,154

(22) PCT Filed: Mar. 26, 2018

(86) PCT No.: PCT/JP2018/011956
§ 371 (c)(1),
(2) Date: Sep. 27, 2019

(87) PCT Pub. No.: WO2018/181081
PCT Pub. Date: Oct. 4, 2018

(65) Prior Publication Data
US 2021/0110776 A1    Apr. 15, 2021

(30) Foreign Application Priority Data

Mar. 31, 2017  (JP) .............................. JP2017-071038

(51) Int. Cl.
*G06F 3/038* (2013.01)
*G09G 5/00* (2006.01)
(Continued)

(52) U.S. Cl.
CPC ............ *G09G 3/3406* (2013.01); *G09G 3/36* (2013.01); *G09G 2320/0626* (2013.01); *G09G 2360/145* (2013.01)

(58) Field of Classification Search
CPC .............. G09G 3/3426; G09G 3/3413; G09G 2320/0233
See application file for complete search history.

(56) References Cited

U.S. PATENT DOCUMENTS

2009/0146941 A1    6/2009  Fujine et al.
2011/0134324 A1*   6/2011  Ichioka ................ H04N 21/431
                                                        348/564
(Continued)

FOREIGN PATENT DOCUMENTS

JP     2005-338327 A    12/2005
JP     2005-346032 A    12/2005
(Continued)

*Primary Examiner* — Nan-Ying Yang
(74) *Attorney, Agent, or Firm* — ScienBiziP, P.C.

(57) ABSTRACT

The present invention provides an image display device capable of appropriately controlling the luminance of its backlight even with a frame memory having a size larger than the size of the active area. The image display device of the present invention includes: an image display panel configured to display an image; a backlight configured to illuminate the image display panel; a frame memory having a size larger than the size of an active area of the image display panel; and a luminance determiner configured to determine the luminance of the backlight based on an image data set of a computational area among image data sets stored in the frame memory, the computational area being at least part of the active area.

7 Claims, 7 Drawing Sheets

(51) Int. Cl.
 *G09G 3/36* (2006.01)
 *G09G 5/10* (2006.01)
 *G09G 3/34* (2006.01)

(56) References Cited

U.S. PATENT DOCUMENTS

2012/0112988 A1* 5/2012 Nakanishi ......... G02F 1/134309
 345/76
2018/0145116 A1* 5/2018 Lee ..................... G09G 3/3413

FOREIGN PATENT DOCUMENTS

| JP | 2007-140483 A | 6/2007 |
| JP | 2016-018149 A | 2/2016 |

\* cited by examiner (a)

(b)

(c)

(a)

(b)

(a)

(b)

IMAGE DISPLAY DEVICE

TECHNICAL FIELD

The present invention relates to image display devices. Specifically, the present invention relates to an image display device including a backlight.

BACKGROUND ART

In recent years, intense research has been conducted to reduce the power consumption of image display devices including a backlight. For example, light emitting diodes (LED) have been used as light sources of backlights of image display devices. However, even in low power consumption image display devices using LEDs, the power consumption by the backlight still accounts for a large proportion of the total power consumption. Thus, techniques for controlling the luminance of the backlight to reduce the power consumption have been continuously studied.

For example, Patent Literature 1 discloses a technique which uses a display device including: a detection means that compares a first image data set displayed in the current frame with a second image data set to be displayed in the next frame so as to detect a changed portion, that is, a portion of the second image that has changed relative to the first image; a determination means that determines a computation target area for the second image frame such that the computation target area includes all the light sources corresponding to the changed portion, where the computation target area is a target of computational processing for the luminance; and a setting means that sets how the light sources in the computational target area are divided into luminescent units according to the total number of the light sources included in the computation target area. The technique can reduce the power consumption and improve the image quality of an area with an image change while ensuring the real-time characteristics without increasing the amount of processing.

CITATION LIST

Patent Literature

Patent Literature 1: JP 2016-18149 A

SUMMARY OF INVENTION

Technical Problem

Content adaptive brightness control (CABC) is a known technique for reducing the power consumption of an image display device including a backlight by controlling the luminance of the backlight. CABC reduces the luminance of the backlight upon input of a generally dark image and performs the corresponding processing such as gamma correction. The technique thus reduces the power consumption of the backlight with less impact on the visibility of the display image.

More specifically, when the input image data set is generally composed of dark gray scale values (low gray scale values), CABC performs luminance correction such that the amount of reduction in the luminance (amount of luminance reduction) of the backlight is large, as well as performing image correction such that the amount of change in the gray scale values (the degree of change from lower gray scale values to higher scale values) is large so as to increase the transmittance of the image display panel. The technique thus reduces the power consumption of the backlight. In CABC, when the input image data set is generally composed of light gray scale values (high gray scale values), the amount of luminance reduction and the amount of change in the gray scale values are both small, so that the visibility of the input original display image can be maintained. CABC is usually performed by a driver IC included in the image display device. In the luminance correction and image data correction, the computational processing is performed with the entire frame memory (e.g., frame memory implemented in the driver IC) provided in the image display device.

To accommodate image display devices to varying uses, the active area, which is an area where an image is actually displayed, in a quadrilateral display panel has been desired to have a non-quadrilateral shape (hereinafter also referred to as an "irregular shape"). Image display devices with an irregular-shaped active area are also called irregular-shaped modules. The non-active area other than the active area displays, for example, an image based on an image data set such as a black data set, that is, an image data set with a gray scale value of 0.

The frame memory of the irregular-shaped module contains the image data set of the non-active area in addition to the image data set of the active area. The frame memory has a size larger than the size of the active area. Thus, when performing CABC in the irregular-shaped module to reduce the power consumption, the driver IC performs computational processing with inclusion of the image data set of the area other than the active area. Therefore, for example, when a black data set is input to the non-active area, the image data set of the active area is recognized to be darker than the image data set of the image actually displayed. This may lead to a significant reduction in the luminance of the backlight.

FIGS. 8(a) and 8(b) are schematic plan views showing a pixel arrangement area in an image display panel of an image display device of a comparative embodiment. FIG. 8(b) shows an example of the number of pixels arranged in an active area and non-active areas. As shown in FIG. 8, an image display device 100 of the comparative embodiment includes an image display panel 180. The image display panel 180 includes a pixel arrangement area 180A in which pixels are arranged in a matrix. The pixel arrangement area 180A consists of an active area 100A having a non-quadrilateral shape and non-active areas 100B that are areas other than the active area 100A. The non-active areas 100B display an image based on a black data set, that is, a black image. The image display device 100 of the comparative embodiment further includes a driver IC with a frame memory implemented therein. In the frame memory are stored an image data set of the active area 100A and image data sets of the non-active areas 100B.

When performing CABC in the image display device 100 of the comparative embodiment to reduce the power consumption, the driver IC performs computational processing with inclusion of the image data set (black data set) of the non-active areas 100B. In other words, the driver IC recognizes the image data set of the active area to be darker than the image data set of the image actually displayed in the active area 100A. This may lead to a significant reduction in the luminance of the backlight and to display of a dark image in the active area 100A. There is thus a demand for appropriate control of the luminance of the backlight in an image display device having an irregular-shaped active area.

Patent Literature 1 studies the case of a quadrilateral active area, and does not disclose a method for appropriate control of the luminance of the backlight in an image display device having an irregular-shaped active area.

The present invention was made in view of the situation in the art. The present invention aims to provide an image display device capable of appropriately controlling the luminance of its backlight even with a frame memory having a size larger than the size of the active area.

Solution to Problem

The present inventors made various studies on an image display device capable of appropriately controlling the luminance of its backlight even with a frame memory having a size larger than the size of the active area. The inventors found out that even with such a frame memory, by determining the luminance of the backlight based on an image data set of at least part of the active area among image data sets stored in the frame memory, it is possible to avoid determining the luminance of the backlight by computational processing with inclusion of an image data set of an area other than the active area. The inventors thus reached a solution of the above problems and arrived at the present invention.

One aspect of the present invention may be an image display device including: an image display panel configured to display an image; a backlight configured to illuminate the image display panel; a frame memory having a size larger than the size of an active area of the image display panel; and a luminance determiner configured to determine the luminance of the backlight based on an image data set of a computational area among image data sets stored in the frame memory, the computational area being at least part of the active area.

The computational area may be a quadrilateral area inside the active area.

Advantageous Effects of Invention

The present invention can provide an image display device capable of appropriately controlling the luminance of its backlight even with a frame memory having a size larger than the size of an active area.

BRIEF DESCRIPTION OF DRAWINGS

FIG. 2(b) shows an example of the number of pixels arranged in an active area and non-active areas.

FIG. 4(a) is an exemplary display image. FIG. 4(b) is an exemplary histogram showing the gray scale values of an active area data set. FIG. 4(c) is an exemplary histogram showing the gray scale values of a computational area data set.

FIG. 8(b) shows an example of the number of pixels arranged in an active area and non-active areas.

FIG. 9(a) is an exemplary display image. FIG. 9(b) is an exemplary histogram showing the gray scale values of an image data set in the entire frame memory.

DESCRIPTION OF EMBODIMENTS

Hereinafter, embodiments of the present invention are described. The embodiments, however, are not intended to limit the scope of the present invention. The configurations in the embodiments may be appropriately combined or modified within the spirit of the present invention.

Embodiment

Figure 1:
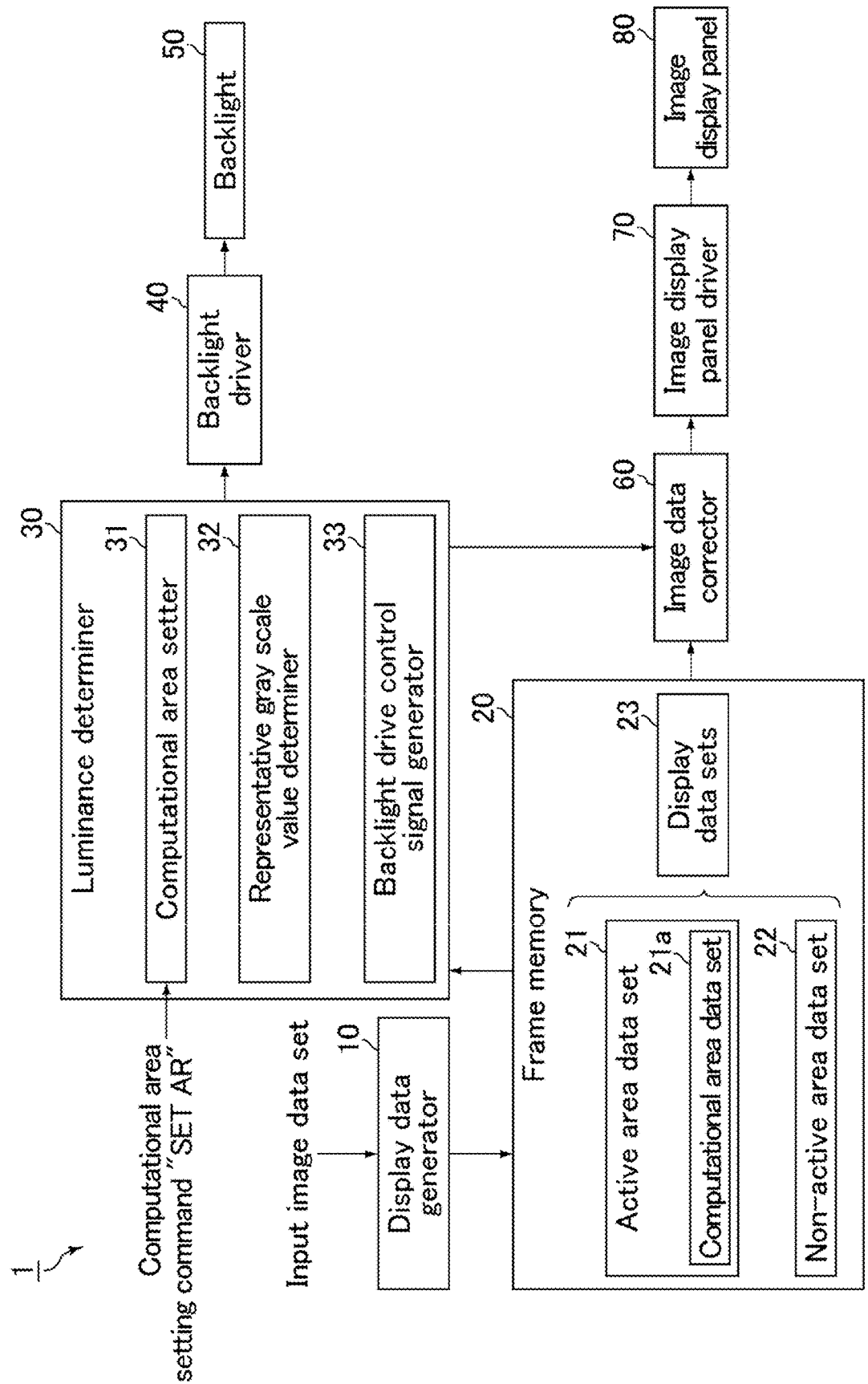
FIG. 1 is a block diagram showing a specific structure of an image display device of an embodiment.

FIG. 1 is a block diagram showing a specific structure of an image display device of the embodiment. FIGS. 2(a) and 2(b) are schematic plan views showing a pixel arrangement area in an image display panel of the image display device of the embodiment. FIG. 2(b) shows an example of the number of pixels arranged in an active area and non-active areas.

As shown in FIG. 1, an image display device 1 of the present embodiment includes a display data generator 10, a frame memory 20, a luminance determiner 30, a backlight driver 40, a backlight 50, an image data corrector 60, an image display panel driver 70, and an image display panel 80 that is quadrilateral in a plan view. The image display device 1 of the present embodiment displays an image based on an input image data set input from the outside (or from the host). The image display device 1 modulates the light from the backlight 50 to display an image on the image display panel 80. The image display device 1 of the present embodiment may include a driver IC. The driver IC of the image display device 1 of the present embodiment includes the frame memory 20, the luminance determiner 30, the image data corrector 60, and the image display panel driver 70. The driver IC may be composed of a single chip. The frame memory 20 may be implemented in the driver IC or in a portion of the image display device 1 other than the driver IC. The display data generator 10 may be implemented in a device in which the image display device 1 is installed, for example. Examples of the image display device 1 include liquid crystal display devices that display an image using a liquid crystal element and MEMS shutter displays that use a micro electro mechanical system (MEMS) shutter instead of the liquid crystal element.

Figure 2:
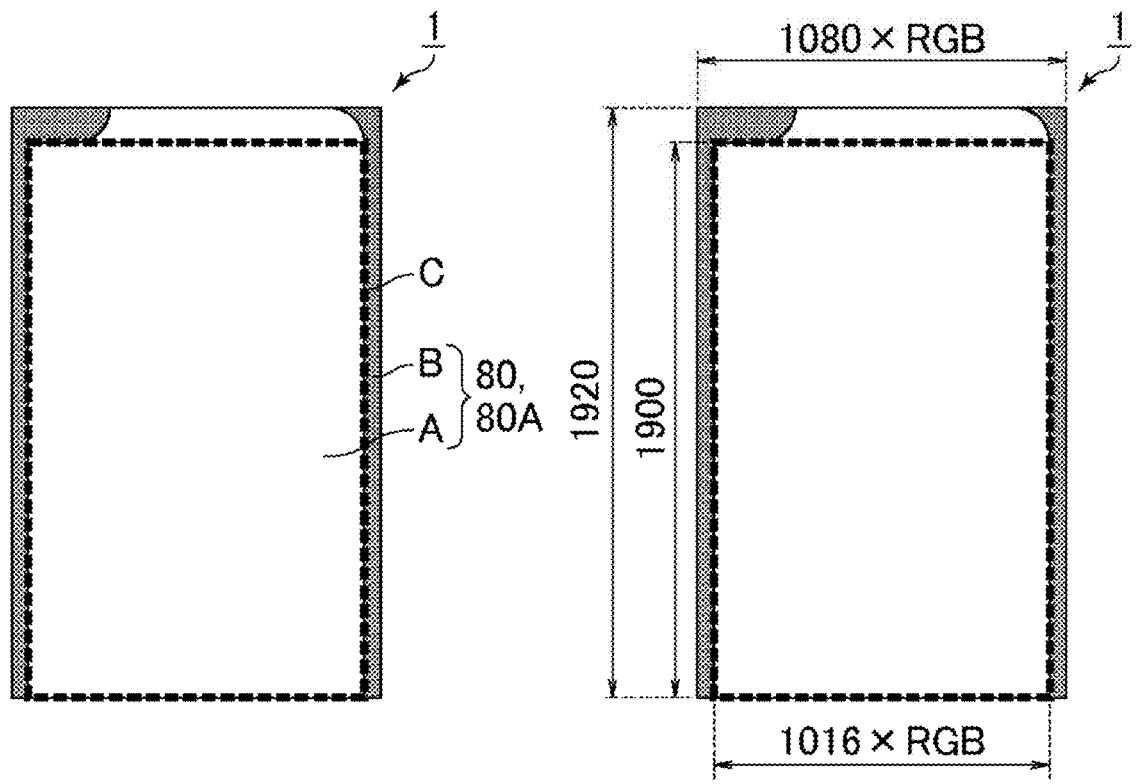
FIGS. 2(a) and 2(b) are schematic plan views showing a pixel arrangement area in an image display panel of the image display device of the embodiment.

As shown in FIG. 2, the image display panel 80 of the image display device 1 of the embodiment includes a quadrilateral pixel arrangement area 80A in which pixels are arranged in a matrix. The pixel arrangement area 80A is composed of an active area A that is an area where an image (image based on an input image data set) is actually displayed, and non-active areas B that are areas other than the active area A. The non-active areas B display an image based on a predetermined image data set different from the input image data set. For example, in the non-active areas B, a signal based on a black data set (image data set with a gray scale value of 0) is input and a black image is displayed. The active area A includes a computational area C to be described later.

The active area A has a non-quadrilateral shape. The "quadrilateral shape" as used herein means a tetragonal shape in which all the corners are right angles, including a rectangular shape and a square shape. The active area A of the present embodiment may have any non-quadrilateral shape. Specific examples thereof include: a circular shape; an elliptic shape; a triangular shape; a quadrangular shape other than the quadrilateral shape, such as a trapezoidal shape; a pentagonal or higher polygonal shape; any of these polygonal shapes (including a triangular shape and a quadrangular shape other than the quadrilateral shape) in which at least one corner is rounded; and any of these shapes in which at least one cut (recess) is formed. More specific examples include, as shown in FIG. 2, a rectangular shape in which one of two adjacent corners among the four corners is arched, and the other is cut (recessed).

The display data generator 10 generates display data sets 23 from one frame's worth of the input image data set input from the outside. The display data sets 23 include an active area data set 21 that is an image data set of the active area A and non-active area data sets 22 that are image data sets of the non-active areas B. The display data generator 10 stores the display data sets 23 in the frame memory 20. When the display data sets 23 are generated, tone mapping may be applied to the input image data set. In the present embodiment, part of the input image data set is used as the active area data set 21, while predetermined image data sets that are set independently from the input image data set are used as the non-active area data sets 22. Specifically, as described above, the non-active area data sets 22 are each preferably a black data set. The non-active area data sets 22 each may be an image data set of a single color other than black, or an image data set constituting any pattern.

The frame memory 20 is a memory device that is also called a frame buffer. The frame memory 20 can hold the display data sets 23 including one frame's worth of the active area data set 21 and the non-active area data sets 22. In other words, the frame memory 20 has a size larger than the size of the active area 21. When display data sets 23 of a new frame are input to the frame memory 20 from the display data generator 10, the display data sets 23 of the previous frame are replaced with the display data sets 23 of the new frame. Here, the phrase "the frame memory 20 has a size larger than the size of the active area 21" means that the size of the image based on the image data sets (one frame's worth of image data sets) stored in the frame memory 20 is larger than the size of the image displayed in the active area 21. The difference in size between the frame memory 20 and the active area 21 is not limited, and can be appropriately set according to factors such as the shape of the active area A and the proportion of the area of the active area A in the pixel arrangement area 80A.

The luminance determiner 30 determines the extent to which the luminance is reduced (hereinafter also referred to as an "amount of luminance reduction") relative to the maximum luminance 100% of the backlight 50, based on an image data set of a computational area C that is at least part of the active area A among the display data sets 23 stored in the frame memory 20. Thus, in the present embodiment, the luminance of the backlight 50 can be more appropriately controlled to correspond to the active area A and the power consumption of the image display device 1 can be more reduced than in the case of correcting the luminance of the backlight 50 based on areas including an area other than the active area A. The image data set of the computational area C herein is also referred to as a computational area data set 21a.

Figure 3:
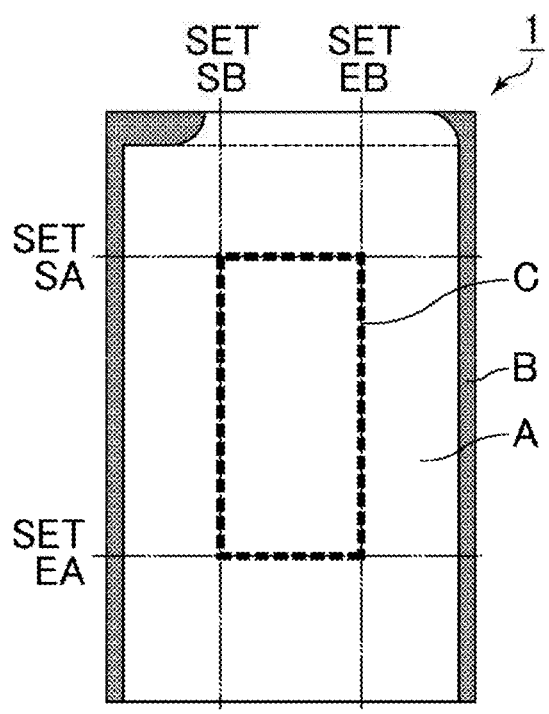
FIG. 3 is a view showing a computational area of the image display device of the embodiment.

FIG. 3 is a view showing the computational area of the image display device of the embodiment. In the present embodiment, the computational area C of the frame memory 20 can be set as desired. The computational processing relating to luminance correction can be performed only on the set computational area C.

In FIG. 3, "SET SA" refers to a computational area start setting in the vertical direction of the image display panel 80. "SET EA" refers to a computational area end setting in the vertical direction of the image display panel 80. "SET SB" refers to a computational area start setting in the horizontal direction of the image display panel 80. "SET EB" is a computational area end setting in the horizontal direction of the image display panel 80. The vertical direction is a direction parallel to data lines provided in the image display panel 80. The horizontal direction is a direction parallel to scanning lines provided in the image display panel 80.

The luminance determiner 30 includes a computational area setter 31, a representative gray scale value determiner 32, and a backlight drive control signal generator 33. Upon receiving the command "SETAR" containing "SET EA", "SET EA", "SET SB", and "SET EB", which are parameters defining the computational area C, the computational area setter 31 sets the area surrounded by "SET EA", "SET EA", "SET SB", and "SET EB" as the computational area C. As a result, a quadrilateral area inside the active area A can be set as the computational area C.

The computational area C is at least part of the active area A. The computational area C may be the same area as the active area A. The computational area C may have any shape. Examples of the shape include a quadrilateral shape (a rectangular shape or a square shape), a trapezoidal shape, a circular shape, and an elliptic shape. The computational area C preferably has a quadrilateral shape that has as large an area as possible inside the active area A. Such a structure allows computational processing on more image data of the active area A in determination of the luminance, thus allowing more appropriate control of the luminance of the backlight 50.

The computational area C may have any area. Preferably, the computational processing is performed based on an image data set of equal to or more than half of the active area A. In other words, the computational area C preferably has an area of 50% or higher and 100% or lower of the area of the active area A.

The representative gray scale value determiner 32 determines the representative gray scale value based on the image data set (computational area data set 21*a*) of the computational area C set by the computational area setter 31. The "representative gray scale value" is a value representing the information about whether the computational area data set 21*a* is "a generally light image data set or a generally dark image data set". The representative gray scale value may be the maximum gray scale value or the average gray scale value of the computational area C, for example. Alternatively, the representative gray scale value may be determined according to the information of a histogram obtained from the gray scale values of the image data set of the pixels in the computational area C. The lighter the image data set is, the larger the calculated representative gray scale value is.

The backlight drive control signal generator 33 performs predetermined correction of the luminance of the backlight 50 based on the representative gray scale value determined by the representative gray scale value determiner 32, and generates a control signal.

Specifically, when acquiring, from the representative gray scale value determiner 32, a large representative value calculated from a generally light image data set, the backlight drive control signal generator 33 corrects the luminance to provide a small amount of luminance reduction of the backlight 50 to avoid reducing the visibility of the image (image quality), and generates a drive control signal. In other words, the backlight drive control signal generator 33 transmits to the backlight driver 40 a drive control signal (pulse width modulation (PWM) signal) to provide a small amount of luminance reduction of the backlight 50.

In contrast, when acquiring, from the representative gray scale value determiner 32, a small representative gray scale value calculated from a generally dark image data set, the backlight drive control signal generator 33 corrects the luminance to provide a large amount of luminance reduction of the backlight 50, and generates a drive control signal. In other words, the backlight drive control signal generator 33 transmits to the backlight driver 40 a PWM signal to provide a large amount of luminance reduction of the backlight 50.

As described above, in the luminance determiner 30, the computational area setter 31 sets the computational area C. The representative gray scale value determiner 32 calculates the representative gray scale value of the computational area C. Upon receiving the representative gray scale value, the backlight drive control signal generator 33 corrects the amount of reduction in the luminance (amount of luminance reduction) of the backlight 50 based on the representative gray scale value, and transmits a PWM signal indicating the luminance of the backlight 50 according to the correction. The backlight driver 40 is configured to perform, upon receiving the PWM signal, control to reduce the luminance of the backlight 50 according to the PWM signal.

The specific method by which the luminance determiner 30 determines the luminance is not limited to the above method. The specific method may be appropriately set as long as the luminance determiner 30 determines the luminance of the backlight 50 based on the image data set of the computational area C that is at least part of the active area A among the image data sets (display data sets 23) stored in the frame memory 20.

The backlight 50 functions to illuminate the image display panel 80. The backlight 50 includes a light source that can change the luminance. Examples of the light source include LEDs.

In correspondence with the amount of luminance reduction of the backlight 50 determined by the luminance determiner 30, the image data corrector 60 generates a converted display data set by increasing the gray scale values of the active area data set 21 among the display data sets 23 from the original values. The image data corrector 60 transmits the converted display data set to the image display panel driver 70. The image data corrector 60 can change the gray scale values of the active area data set 21 by, for example, applying gamma correction to the active area data set according to the amount of luminance reduction. The image data corrector 60 usually performs no correction processing on the non-active area data sets 22 among the display data sets 23. Thus, the converted display data set is usually composed of the non-active area data sets 22 and the image data set obtained by correcting the gray scale values of the active area data set 21.

The image display panel driver 70 is configured to drive and control the image display panel 80 according to the converted display data set transmitted from the image data corrector 60.

The image display panel 80 functions to display an image under illumination by the backlight 50. The image display panel 80 displays an image based on the converted display data set transmitted from the image display panel driver 70. When the luminance of the backlight 50 is corrected to reduce the power consumption, the brightness of the image displayed on the image display panel 80 changes according to the amount of luminance reduction. Here, changing the gray scale values by the image data corrector 60 allows appropriate control of the brightness of the image displayed on the image display panel 80, thus making it possible to bring the image displayed on the image display panel 80 closer to the actual image (image based on the input image data set).

In the present embodiment, the CABC function is set not for the entire frame memory 20 but for the computational area C that is at least part of the active area A. The CABC function thus can be used without being affected by the image data sets of the non-active areas B.

The image display device 1 of the present embodiment may be used in any application or in any device. Since it can reduce the power consumption, it is suitable for portable devices such as cellular phones, smartphones, and tablet PCs.

The following shows a comparison between CABC performed in the display device 1 of the present embodiment and CABC performed in the image display device 100 of the comparative embodiment. The image display device 100 of the comparative embodiment has the same structure as the image display device 1 of the present embodiment except that the image display device 100 performs computational processing with the entire frame memory.

Figure 4:
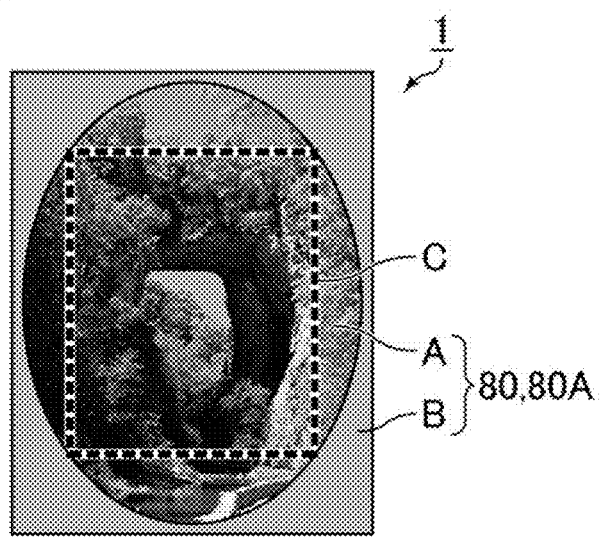
FIG. 4 shows views relating to the image display device of the embodiment before luminance correction and image correction.
Figure 4:
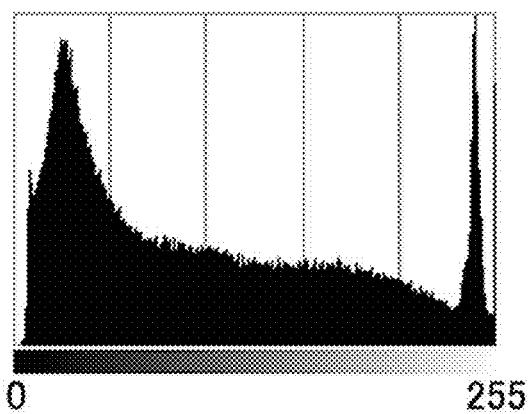
Figure 4:
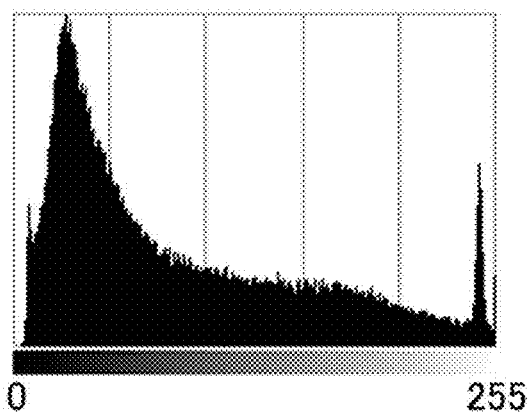
Figure 9:
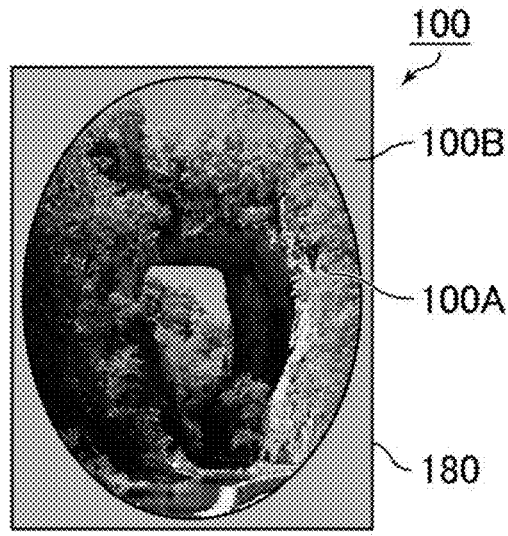
FIG. 9 shows views relating to the image display device of the comparative embodiment before luminance correction and image correction.
Figure 9:
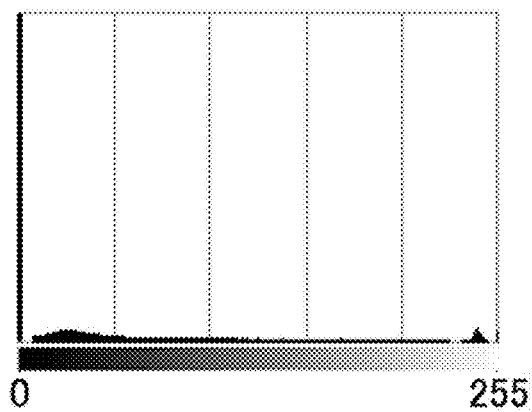

FIG. 4 shows views relating to the image display device of the embodiment before the luminance correction and image correction. FIG. 4(*a*) is an exemplary display image. FIG. 4(*b*) is an exemplary histogram showing the gray scale values of the active area data set. FIG. 4(*c*) is an exemplary histogram showing the gray scale values of the computational area data set. FIG. 9 shows views relating to the image display device of the comparative embodiment before the luminance correction and image correction. FIG. 9(*a*) is an exemplary display image. FIG. 9(*b*) is an exemplary histogram showing the gray scale values of an image data set in the entire frame memory.

As shown in FIG. 4, before the luminance correction and image correction, the shape of the histogram showing the gray scale values of the active area data set 21 is similar to the shape of the histogram showing the gray scale values of the computational area data set 21a. In contrast, as shown in FIG. 4 and FIG. 9, the shape of the histogram showing the gray scale values of the image data set in the entire frame memory is very different from the shape of the histogram showing the gray scale values of the active area data set 21, because the frame memory contains the black data sets of the non-active areas B. Thus, the present embodiment, which performs computational processing based on the computational area data set 21a, can perform computational processing based on an image data set close to the image data set of the active area A compared to the comparative embodiment.

Figure 5:
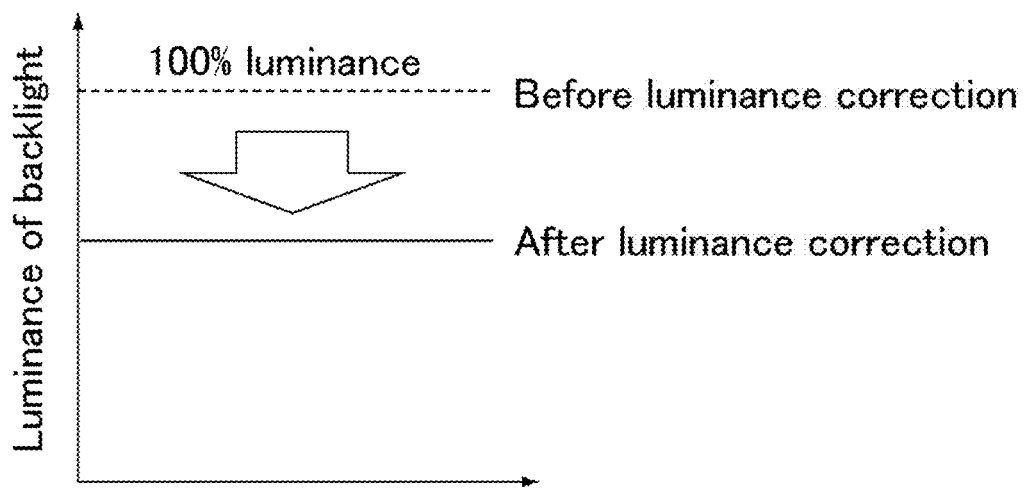
FIG. 5 is a graph schematically showing the luminance of a backlight of the image display device of the embodiment before and after the luminance correction.
Figure 10:
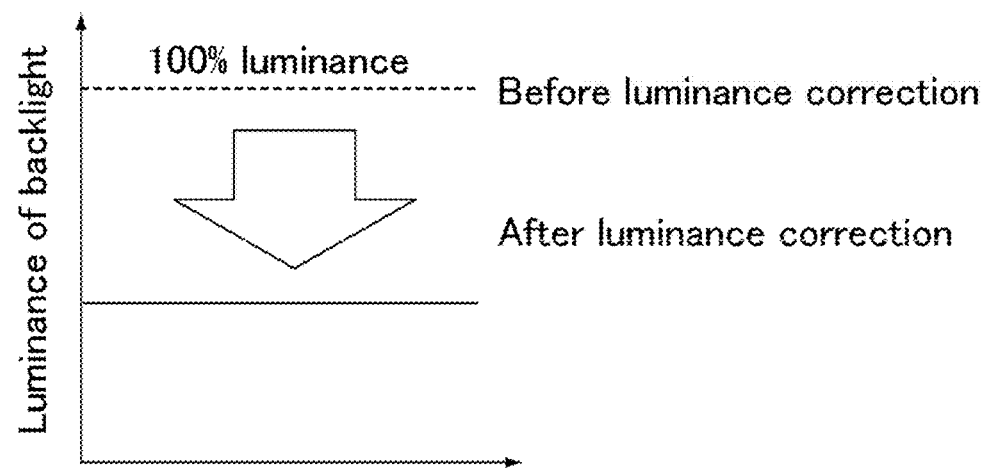
FIG. 10 is a graph schematically showing the luminance of a backlight of the image display device of the comparative embodiment before and after the luminance correction.

FIG. 5 is a graph schematically showing the luminance of the backlight of the image display device of the embodiment before and after the luminance correction. FIG. 10 is a graph schematically showing the luminance of the backlight of the image display device of the comparative embodiment before and after the luminance correction.

The image display device 100 of the comparative embodiment performs computational processing with inclusion of the black data sets of the non-active areas B. As a result, as shown in FIG. 10, the luminance of the backlight may be significantly reduced. In contrast, the image display device 1 of the present embodiment performs computational processing on the computational area C in the active area A. Thus, as shown in FIG. 5, the luminance of the backlight is not excessively reduced as in the image display device 100 of the comparative embodiment. The image display device 1 of the present embodiment thus can more appropriately control the luminance of the backlight 50 than the image display device 100 of the comparative embodiment which performs computational processing with the entire frame memory for the luminance correction.

Figure 6:
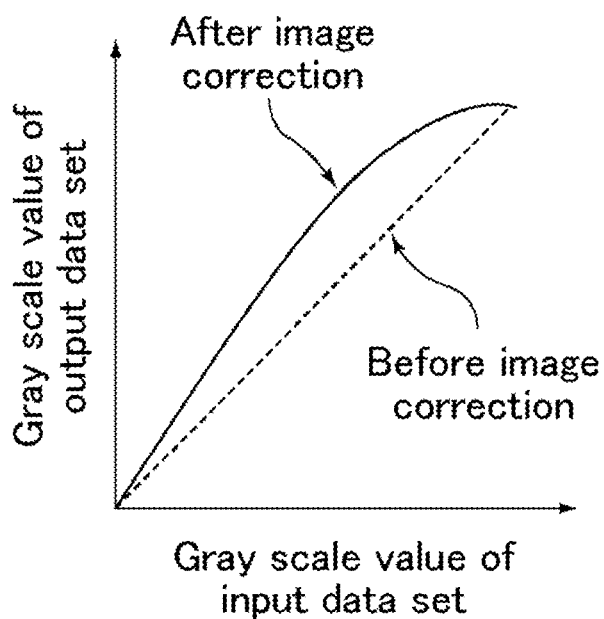
FIG. 6 is a graph schematically showing the relation between the gray scale values of an input data set and an output data set of an image data corrector of the image display device of the embodiment before and after the image correction.
Figure 11:
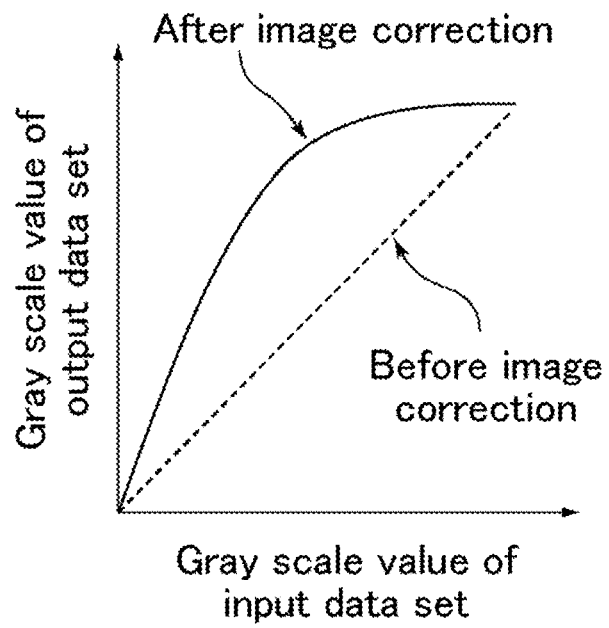
FIG. 11 is a graph schematically showing the relation between the gray scale values of an input data set and an output data set of an image data corrector of the image display device of the comparative embodiment before and after image correction.

FIG. 6 is a graph schematically showing the relation between the gray scale values of an input data set and an output data set of the image data corrector of the image display device of the embodiment before and after the image correction. FIG. 11 is a graph schematically showing the relation between the gray scale values of an input data set and an output data set of the image data corrector of the image display device of the comparative embodiment before and after the image correction.

In the image correction, the gray scale values of the image data set are changed according to the amount of luminance reduction of the backlight. In the comparative embodiment, thus, as shown in FIG. 11, the gray scale values of the output data set may be unnecessarily greatly changed. In contrast, in the present embodiment, the image correction is performed according to appropriately corrected luminance of the backlight. Thus, as shown in FIG. 6, the gray scale values of the image data set are not as greatly changed as in the comparative embodiment.

Figure 7:
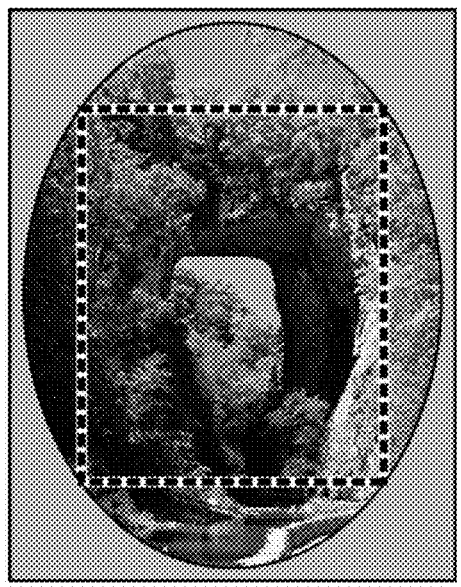
FIG. 7 is an exemplary image displayed after the luminance correction and image correction in the image display device of the embodiment.
Figure 8:
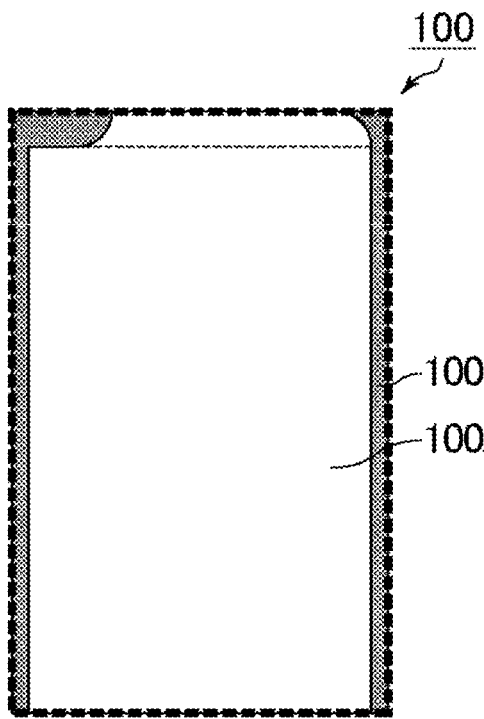
FIGS. 8(a) and 8(b) are schematic plan views showing a pixel arrangement area in an image display panel of an image display device of a comparative embodiment.
Figure 8:
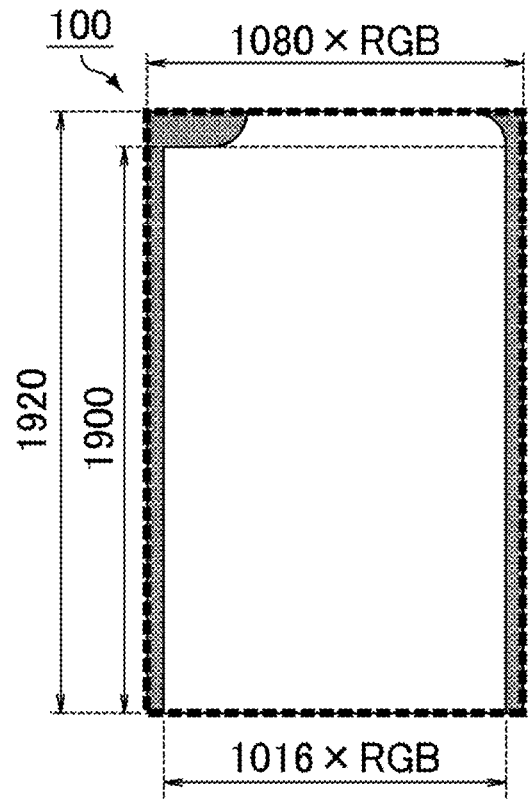
Figure 12:
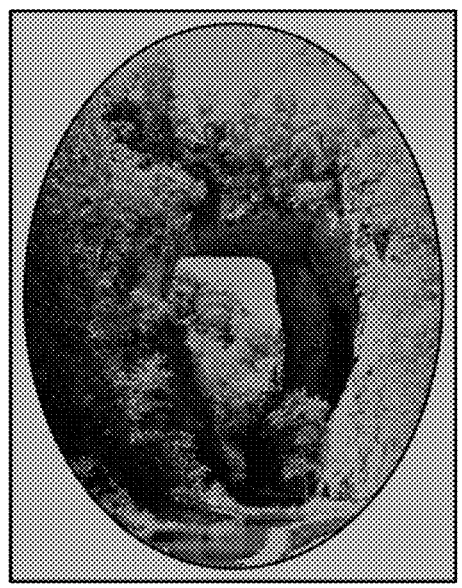
FIG. 12 is an exemplary image displayed after the luminance correction and image correction in the image display device of the comparative embodiment.

FIG. 7 is an exemplary image displayed after the luminance correction and image correction in the image display device of the embodiment. FIG. 12 is an exemplary image displayed after the luminance correction and image correction in the image display device of the comparative embodiment. As shown in FIG. 7 and FIG. 12, since the image display device 1 of the present embodiment performs computational processing on the computational area C inside the active area A for CABC, the image display device 1 can display an image closer to the actual image than the image display device 100 of the comparative embodiment.

(Modification 1 of Embodiment)

In the embodiment, the computational area C is set as desired by inputting the computational area setting command "SETAR" containing parameters defining the computational area C. The computational area C, however, may be a preset area. For example, the representative gray scale value determiner 32 may determine the representative gray scale value based on an image data set of a predetermined computational area C.

[Additional Remarks]

One aspect of the present invention may be an image display device 1 including: an image display panel 80 configured to display an image; a backlight 50 configured to illuminate the image display panel 80; a frame memory 20 having a size larger than the size of an active area A of the image display panel 80; and a luminance determiner 30 configured to determine the luminance of the backlight 50 based on an image data set of a computational area C among image data sets stored in the frame memory 20, the computational area C being at least part of the active area A.

The image display device 1 determines the luminance of the backlight 50 based on the image data set of the computational area C that is at least part of the active area A among image data sets of the active area A stored in the frame memory 20. It is thus possible to avoid determining the luminance of the backlight by performing computational processing with inclusion of an image data set of a non-active area B. As a result, the image display device 1 can appropriately control the luminance of the backlight 50.

The computational area C may be a quadrilateral area inside the active area A.

With such a structure, the computational area C can be easily specified by inputting a command containing parameters defining the area to the luminance determiner 30.

REFERENCE SIGNS LIST 1, 100: image display device
10: display data generator
20: frame memory
21: active area data set
21a: computational area data set
22: non-active area data set
23: display data sets
30: luminance determiner
31: computational area setter
32: representative gray scale value determiner
33: backlight drive control signal generator
40: backlight driver
50: backlight
60: image data corrector
70: image display panel driver
80, 180: image display panel
80A, 180A: pixel arrangement area
100A, A: active area
100B, B: non-active area
C: computational area

The invention claimed is:

1. An image display device comprising:
an image display panel configured to display an image and having an active area and a non-active area;
a backlight configured to illuminate the image display panel;
a frame memory having a size larger than a size of the active area of the image display panel;
a luminance determiner configured to determine luminance of the backlight based on an image data set of a computational area among image data sets stored in the frame memory, the computational area being at least part of the active area; and
a backlight driver, wherein:
the active area is an area where an image based on an input image data set is displayed;
the non-active area is an area other than the active area and displays an image based on a predetermined image data set different from the input image data set;
the frame memory stores display data sets including an active area data set that is an image data set of the active area and a non-active area data set that is an image data set of the non-active area;
the active area has a non-quadrilateral shape;
the luminance determiner includes a representative gray scale value determiner and a backlight drive control signal generator;
the representative gray scale value determiner determines a representative gray scale value that is a value representing information about whether the image data set of the computational area is a generally light image data set or a generally dark image data set based on the image data set of the computational area;
the backlight drive control signal generator corrects an amount of luminance reduction of the backlight based on the representative gray scale value and transmits a pulse width modulation signal indicating luminance of the backlight to the backlight driver according to the correction;
the backlight driver controls to reduce the luminance of the backlight according to the pulse width modulation signal;
when acquiring, from the representative gray scale value determiner, a large representative value calculated from a generally light image data set, the backlight drive control signal generator transmits to the backlight driver a pulse width modulation signal to provide a small amount of luminance reduction of the backlight; and
when acquiring, from the representative gray scale value determiner, a small representative gray scale value calculated from a generally dark image data set, the backlight drive control signal generator transmits to the backlight driver a pulse width modulation signal to provide a large amount of luminance reduction of the backlight.

2. The image display device according to claim 1, wherein the computational area is a quadrilateral area inside the active area.

3. The image display device according to claim 1, further comprising an image data corrector generating a converted display data set by increasing gray scale values of the active area data set among the display data sets from original values in correspondence with an amount of luminance reduction of the backlight determined by the luminance determiner and transmitting the converted display data set to an image display panel driver.

4. The image display device according to claim 1, wherein the representative gray scale value is a maximum gray scale value or an average gray scale value of the computational area.

5. The image display device according to claim 1, wherein the representative gray scale value is determined according to the to information of a histogram obtained from gray scale values of an image data set of pixels in the computational area.

6. The image display device according to claim 1, wherein the lighter the image data set is, the larger the calculated representative gray scale value is.

7. The image display device according to claim 1, wherein the amount of luminance reduction represents an extent to which the luminance is reduced relative to a maximum luminance that is 100% of the backlight.

* * * * *